United States Patent [19]

Fuisz et al.

[11] Patent Number: 4,457,554

[45] Date of Patent: Jul. 3, 1984

[54] METHOD FOR DISPATCHING AIR PASSENGERS, AIRPORT INSTALLATION SUITABLE AND VEHICLE SUITABLE THEREFOR

[76] Inventors: Georg Fuisz, Scharnborststr. 16, D-3057 Neustadt, Lyvbomir Szabo, Ostandstr. 42, D-5000. Köln, both of Fed. Rep. of Germany

[21] Appl. No.: 336,389

[22] PCT Filed: Apr. 27, 1981

[86] PCT No.: PCT/DE81/00067
§ 371 Date: Dec. 23, 1981
§ 102(e) Date: Dec. 23, 1981

[87] PCT Pub. No.: WO81/03004
PCT Pub. Date: Oct. 29, 1981

[30] Foreign Application Priority Data

Apr. 25, 1980 [DE] Fed. Rep. of Germany ....... 3016024
Aug. 28, 1980 [DE] Fed. Rep. of Germany ....... 3032342
Feb. 5, 1981 [DE] Fed. Rep. of Germany ....... 3103916

[51] Int. Cl.³ .............................................. B62D 31/02
[52] U.S. Cl. ..................................... 296/179; 180/140; 244/137 R
[58] Field of Search ....................... 296/179, 178, 1 R; 244/137 R, 137 P, 114 R, 50; 180/140, 24

[56] References Cited

U.S. PATENT DOCUMENTS 3,903,979  9/1975  Perrotin .............................. 180/140
4,181,347  1/1980  Clark .................................. 296/24 R
4,269,429  5/1981  Eichstadt ............................. 244/50

FOREIGN PATENT DOCUMENTS

2030926  4/1971  Fed. Rep. of Germany .
7921784  1/1980  Fed. Rep. of Germany .

*Primary Examiner*—Robert R. Song
*Attorney, Agent, or Firm*—Kenyon & Kenyon

[57] ABSTRACT

A method, and a vehicle for dispatching air passengers between the arrival at an arrival zone and boarding the aircraft, with check-in, baggage checking and transport from the arrival zone to the aircraft waiting at the ramp, in which the air passengers, after arriving at the arrival zone, are conducted, together with the baggage, into a cabin mounted on a vehicle, and check-in, baggage checking and, optionally, a security check are performed in the cabin which transports the air passenger directly to the aircraft. The vehicle, thus, takes over a number of functions which heretofore were performed in the stationary airport building. The dispatching takes place simultaneously with the transport of the air passengers to the aircraft.

27 Claims, 18 Drawing Figures

METHOD FOR DISPATCHING AIR PASSENGERS, AIRPORT INSTALLATION SUITABLE AND VEHICLE SUITABLE THEREFOR

BACKGROUND OF THE INVENTION

This invention relates to a method for dispatching air passengers between their arrival in an arrival zone and the boarding of an airplane, with check-in baggage checking and transportation from the arrival zone to an aircraft standing at the ramp, and an airport installation and vehicle suitable therefor.

Air passengers are presently dispatched so that the air passengers arrive at an arrival zone at the airport building and walk with their luggage through the airport building until they arrive at the check-in window or the baggage check-in counter. Even these two facilities may be at a distance from each other. Depending on the design of the airport, passengers are given a boarding pass at the check-in window which is surrendered at the entrance to the waiting room. In more modern airports, the check-in window is directly at the entrance of the waiting room. After passing through security checks, the air passengers remain in the waiting room for a certain time and are then loaded into buses and driven to airplanes waiting at the ramp or pass via telescopically extendable, covered walkways directly from the waiting room to an aircraft which has been taxied close to the waiting room building. In the meantime, baggage is being loaded on baggage vehicles, is taken to the aircraft and is unloaded there again and loaded into the aircraft.

All these operations require separate technical facilities and premises, all of which leads to the situation that modern airport installations require an enormous amount of money and that furthermore, boarding an aircraft is a time-consuming and disagreeable activity as compared, for instance, to boarding a train.

It, thus, is an object of the present invention to accelerate and simplify the dispatching procedure.

SUMMARY OF THE INVENTION

According to the present invention, this problem is solved by the provision that the air passengers are conducted, after they arrive in the arrival zone, together with their baggage, to a vehicle which contains the facilities for checking-in and receiving the baggage; and the check-in and, if required, the security checks take place in the vehicle which transports the air passengers directly to the aircraft.

This method is a departure from the customary dispatch, in which the air passengers pass through different stations, which may be far apart, in a stationary airport building. All these stations or facilities are relocated into the vehicle, so that the air passenger, for normal dispatch, does not enter the airport building at all any more. The vehicle does not make the airport building completely unnecessary; for an extended stay at the airport which occurs due to waiting times when changing airplanes or by similar circumstances, suitable facilities will have to be provided as before. The same applies to the technical facilities which are still provided in an airport apart from those for dispatch of passengers. The long walks in the conventional airport building, however, are eliminated because the required processes take place, in compressed form, in the vehicle which contains windows for checking-in and the necessary electronic facility for checking and possibly changing of reservations, as well as cabins and equipment for security checks.

The separation of the passenger from his baggage is eliminated, which in the conventional airport installation, required extensive organizational arrangements as well as in many cases, time-consuming intermediate processes as well as identification of the baggage to be loaded directly at the aircraft in order to prevent pieces of luggage containing bombs from being smuggled into the aircraft. With the present invention, the air passenger and the baggage carried by him remain together from the time of arrival at the airport until boarding of the airplane.

The check-in and possibly, the security checks can be performed during the waiting time of the vehicle which is necessary for the boarding of the air passengers in the arrival zone, during its travel from the arrival zone to the aircraft and still even during the time of changing from the vehicle to the aircraft. These times therefore are not added to the stay of the air passengers in the vehicle as is the case in the conventional ramp transport, but run in parallel.

An important point is also the absence of a connection between the arrival zone and the air strip proper. It is frequently the case that the conventional airport building must be connected via separate feeders from a nearby traffic station. Even if passengers arrive at the airport in their own motor vehicle, the walks from the extensive parking lots for which frequently no space is available in the immediate vicinity of the airport building or the air strip, can be rather long.

With the present invention, all this does not matter. The arrival zone can be provided at any distance from the airfield. It may be located near the parking lot or at an otherwise suitable area which is not as far from the airfield itself. The air passengers can be transferred directly from there to the aircraft, having been properly dispatched, without entering an airport building itself. Of course, it is also possible to transfer the air passengers from different arrival zones so that all the passengers need no longer be funneled through the central bottle neck of a conventional airport building.

The present invention is not tied to a given size of airport installation, as far as the number of air passengers is concerned. Special advantages, however, are obtained with the present invention in smaller airports to be built because it does away with the necessity to construct extensive stationary building facilities.

The well-known ramp buses are not suitable for the purposes of the present invention because they are designed to serve exclusively for transporting already dispatched air passengers from the waiting rooms to the airplane standing at the ramp. The dispatching has taken place in the stationary airport building. Proper facilities are not found in the ramp bus.

The present invention also relates to an airport facility suitable for carrying out the dispatching method described, as well as a corresponding vehicle.

The vehicle comprises a cabin for the air passengers and the necessary facilities. In general this will be a trackless rubber-tired vehicle.

Preferably, the cabin should have a capacity for accommodating at least a substantial part of the air passengers of an airplane. Considered is for instance, a capacity of about 200 air passengers. For large airplanes, it may be necessary to operate two vehicles in series or in parallel.

The preferred embodiment of the vehicle has a cabin with two stories. The lower story has an entrance accessible from the ground, while the exit in the upper story may be brought into direct connection with the entry of the aircraft, optionally via an adjustable staircase. It makes the vehicle self-sufficient with respect of transferring the air passengers from the ground level in the arrival zone up to the aircraft entrance which is usually located at some height, i.e., no special ramp ladders or similar devices are needed any longer. The air passengers board the lower story themselves, change from the lower story to the upper story within the vehicles and leave the upper story toward the aircraft entrance substantially at the same height.

Having the check-in windows extending along the middle of the lower story, and a set-down zone for the baggage designed as a longitudinal conveyor arranged on the longitudinal outer side of the vehicle opposite the access side of the check-in windows makes it possible to save the effort of reloading the baggage from the check-in point to the airplane. The air passengers set down their baggage in the vehicle whereupon it is reloaded directly from there into the aircraft.

Advantageously, the device for checking in, provided in the cabin, contains in the usual manner, display equipment for checking the reservations and optionally, also a device for storing other reservation actions.

This equipment may be connected via radio to the central data processing installation of the airport; the radio transmission system need have only the limited range of the maximum distance of the vehicle from the airport building.

With a cabin which has two stories, and a check-in facility in the lower story and opposite the entrance a stairway or an elevator for transferring the air passengers from the lower to the upper story, the air passengers, after boarding the vehicle, pass check-in windows and subsequently move over to the upper story of the vehicle. Thus, on the second story there are only dispatched air passengers who do not have to be checked further and can board the aircraft immediately without having to overcome accident-promoting intermediate stations such as stairs or the like.

By placing the compartment for the security check of the air passengers and the carry-on baggage in the only passage to the upper story, no air passenger can therefore get to the upper story and into the aircraft without having passed through the compartment for the security check. Also, leaving the upper story is possible only via this compartment and can therefore be prevented with high certainty.

A cabin which contains the necessary facilities and can accommodate a number of passengers in the order of about 200 naturally has a certain size. A weight in the order of about 40 tons can be expected.

The use of a container transporter chassis permits designing such a cabin economically in the form of a vehicle.

Container transporters are portal-like vehicles with two lateral longitudinal girder structures, at the underside of which supporting wheels are arranged front and back, at least one pair of wheels being steerable about a vertical axis. The equipment can be self-propelled, in which case the drive is arranged on the longitudinal structures or in a transverse region located above the free portal space.

The container transporters can be driven over a container, or several such containers stacked on top of each other, located on the floor or a low-slung road or track vehicle, and can lift them by means of a lifting device. The container hanging in the free portal space is then driven to the desired point. In view of the possible weight of one or more containers with the customary dimensions, container transporters are capable of carrying considerable loads of just the order of magnitude of interest here. A cabin supported by a container transporter chassis allows making use of the available technology of these vehicles so that the remaining design effort consists only of integrating the cabin into the vehicle chassis in a suitable manner.

This goal is achieved with a cabin supported by a container transporter chassis, the supporting longitudinal girders of the container transporter chassis being bridged by transverse members which extend between the stories at the height of the ceiling or floor, and support the cabin. This arrangement allows suspending the lower story from the transverse members while the upper story is placed thereon. The transverse members therefore do not interfere because they are arranged in the region of the separation between the upper and the lower story but not transversely through one of them.

If an available container transporter is to be used without changes in design, the width remaining between the longitudinal girders or the wheels may be too small for the purposes of the present invention. In that case the cabin supported by a container transporter chassis with a part of the cabin provided in the transverse direction between the wheels of the container transporter chassis and another part laterally outside thereof may be used.

Like most container transporters, the vehicle may be self-propelled. However, a trailer pulled by an auxiliary vehicle also falls within the scope of the present invention.

In a further embodiment, the vehicle is supported on a self-supporting and self-propelled, substantially horizontal frame under which several wheel sets are arranged in a well-known manner. The wheels can rotate 360°, controlled in mutual dependence, and the frame comprises two lateral frame girders extending in the longitudinal direction. A lower story of the cabin is suspended between the frame girders while the upper story is supported on the frame girders.

Vehicles with a substantially horizontal frame, under which several individually driven wheel sets are arranged which can be rotated 360°, controlled with mutual interdependence, are known from the field of heavy-duty transport vehicles. The frame is formed here by a platform on which the load can be placed. Also the driver's cabin is mounted under the platform so that no parts of any kind protrude upwards above the platform. If the wheel sets are aligned parallel to each other in the lengthwise or transverse direction, the vehicle executes movements in these directions. However, any other curve radii can also be negotiated, the steering angles of the individual wheel sets of the vehicle being automatically adjusted by the steering mechanism depending on their distance from the respective center of the curve. Such a vehicle therefore has extraordinary maneuverability and, because of its substantially flat topside does not interfere with the design of a cabin supported thereon.

In order to save overall height, an embodiment in which the vehicle has one story and has areas extending laterally beyond the track width may be used. The frame, of course, has of necessity a certain height which, with the embodiment given, can be utilized by accommodating part of the cabin between the frame girders.

However, the vehicle need not necessarily have several stories. In some cases such a design may even be impossible, for instance, if the vehicle must travel under existing building structures or through tunnels which have limited clearance. In such cases, the vehicle may have one story and areas extending laterally beyond the track width, with the floor of the cabin disposed at so low a height above ground that it can be reached via at most three steps. Additional space is gained by parts of the air passenger cabin arranged outside of the track width. This embodiment is not tied to a given design of the chassis.

To save stairs or elevators which are always an obstacle and are inconvenient and accident-provoking for the air passengers, the cabin can have at least one seating arrangement for the air passengers which rises in several steps and comprises several rows of seats which are higher toward the outside and extend in the longitudinal direction of the vehicle at the side wall thereof. This design of the seating arrangement not only gives the air passengers a better view of the proceedings in the cabin and contributes to quieting them down, but permits, on the other hand, ready surveillance of the air passengers by the airline personnel, for instance, for counting the passengers in preparation for the start.

In a further aspect, it is an object of the present invention to decrease, in the case of trackless vehicles, the problems due to the tires, and at the same time, to simplify steering.

This problem is solved by an airport layout having track-bound vehicle and a track system for the vehicle which passes by the arrival zone as well as by the ramp in the immediate vicinity of the aircraft. By using track-bound vehicles, all expenditures for steering are eliminated which can be substantial, considering the size of the vehicles. The track installation runs from the arrival zone to the ramp along a suitable path which has the necessary stations for receiving passengers The airplanes occupy fixed positions which the track installation passes directly. Experience with the conventional terminals, in which the aircraft docks directly, shows that there are no problems if the aircraft occupy fixed positions.

This idea is embodied not only in the airport layout but also in the corresponding vehicle which can also be equipped with wheel sets which allow travelling over the track installation as well as running on a trackless travel surface, i.e., for instance, a road-like path or the ramp.

In airports, in which the airplanes roll directly to the waiting room building, towing vehicles are furthermore necessary which push the aircraft which, of course, cannot go backwards, from the position directly at the waiting room building, into a roll-off position at some distance from this building from which the aircraft can roll with its own propulsion and can continue to roll to the air strip.

It is a further object of the invention also to replace the towing vehicles by devices requiring a smaller expenditure.

According to the present invention, this problem is solved by the provision that the aircraft at the ramp is towed by the vehicle.

The vehicle provided according to the present invention therefore largely takes over not only the functions of the conventional airport building but also part of the functions of the ramp facilities.

While in general, the towing of airplanes away from waiting rooms will not be under consideration because these waiting rooms are eliminated by the system of the present invention, there are enough situations in an airport adapted to the new system especially in a smaller airport, where towing an aircraft is advisable or has advantages as compared to the case that the aircraft travels with its own propulsion which always necessitates certain turning radii and empty space behind the aircraft because of the jet.

Thus, the vehicle has a coupling device by means of which it can be coupled to the aircraft in order to tow the aircraft.

Such coupling devices are known from conventional towing vehicles They usually comprise a coupling rod attached thereto which engages the front wheel of the aircraft.

Since the vehicle according to the present invention is taller than the conventional towing vehicles and cannot travel under the nose of an airplane, the coupling rod will usually have to be longer than usual.

It is therefore advisable that the coupling rod be arranged so that it can run under the vehicle for stowage so that it otherwise does not interfere with the operation of the vehicle.

DETAILED DESCRIPTION

Figure 1:
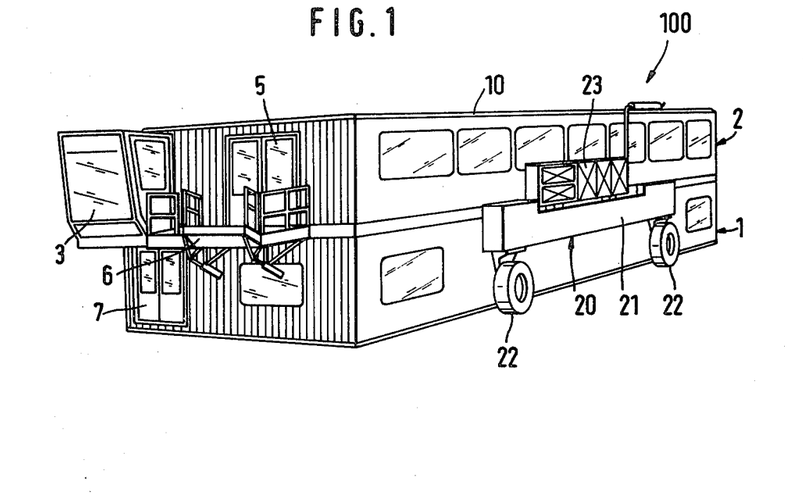
FIG. 1 is a perspective view of the vehicle at an angle from the front.
Figure 2:
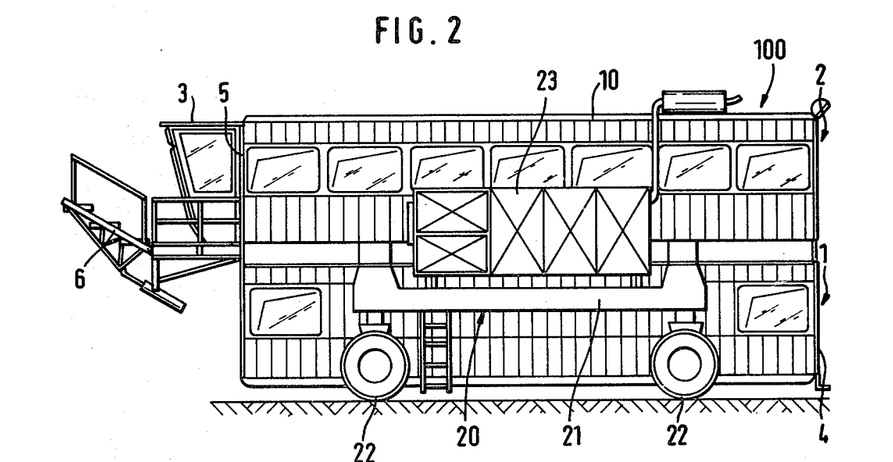
FIG. 2 is a side view of the vehicle with somewhat changed proportions.

The vehicle 100 in FIG. 1, comprises a cabin 10 which consists of a lower story 1 and an upper story 2. The cabin is supported by a container transporter chassis 20, of which a longitudinal girder 21 with air-tire wheels 22 mounted underneath can be seen in FIGS. 1 and 2. One set of wheels 22 is steerable. The container transporter chassis 20 has a propulsion motor 23 which is arranged on the longitudinal girder 21. The vehicle 100 is operated from a driver's cabin 3 which is mounted on the front of the vehicle. The entrance 4 to the cabin 10 is located in the lower story 1 on the back side of the vehicle 100, while the exit 5 is located in the upper story next to the driver's cabin. At the exit 5, a staircase 6 is provided, the height of which can be adapted to the different height levels of the entries of the airplanes and facilitates the passing of the air passengers from the upper story 2 directly into the entrance of the aircraft.

Figure 3:
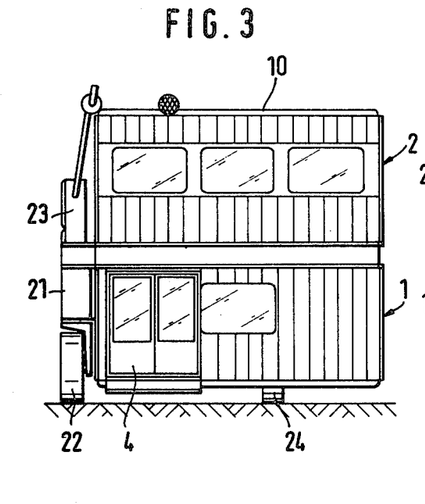
FIG. 3 is a view according to FIG. 2 from the right.

It can be seen in FIG. 3 that the cabin is wider than the container transporter chassis 20. For, the right-hand wheels (as seen in the travel direction) 24 of the latter are not on the right hand side of the cabin 20, but in the interior thereof, as shown in FIG. 3. Through the one-sided overhang, a relatively large additional unimpeded space is gained in the lower story in the cabin 10, as can also be seen in FIGS. 5 and 8

Figure 4:
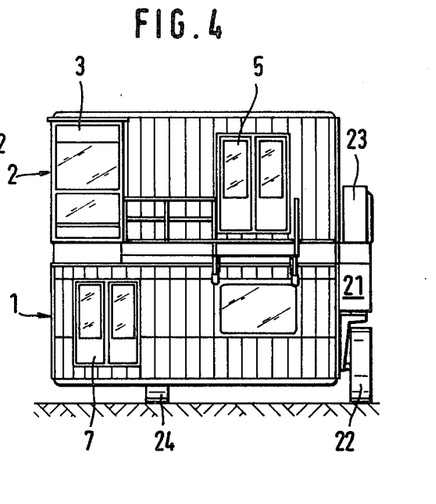
FIG. 4 is a view according to FIG. 2 from the left.
Figure 8:
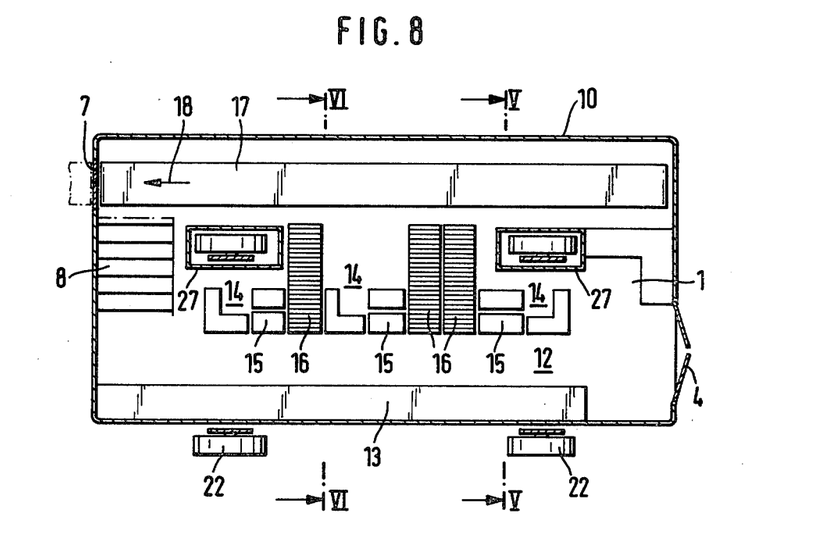
FIG. 8 is a top view of the lower story.

The door 7 on the front of the vehicle, shown in FIG. 4, is closed to the normal air pasenger traffic and is used only for discharging the baggage from the deposit area 17 (FIG. 8).

Figure 5:
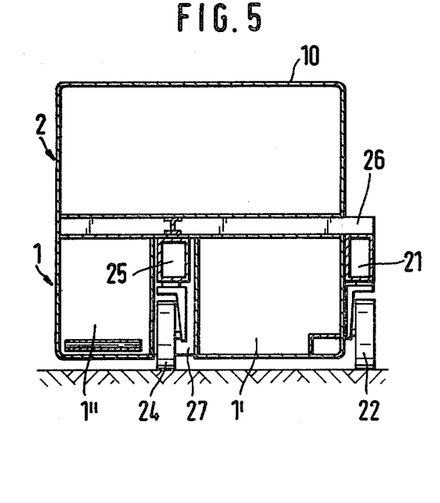
FIG. 5 is a cross section according to the line V—V of FIG. 8.
Figure 6:
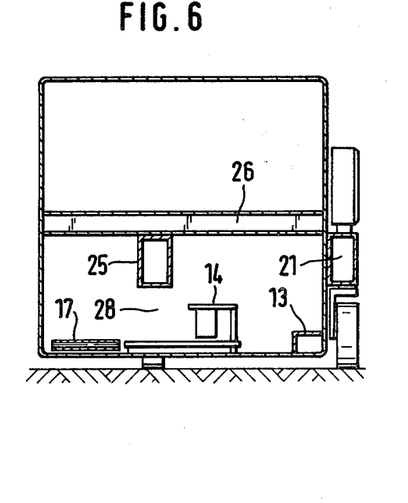
FIG. 6 is a cross section according to the line VI—VI of FIG. 8.

As can be seen from FIG. 5, the two longitudinal girders 21 and 25 of the container transporter chassis are bridged by transverse members 26, on which the upper story 2 is placed and from which the lower story 1 is suspended. The lower story 1 comprises a part 1' between the longitudinal girders 21 and 25 and a part 1" arranged laterally outside thereof. The wheels 24 arranged in the interior of the cabin 10 are accommodated in special fenders 27 (see also FIG. 8). The space 28 remaining between the wheels 24 under the longitudinal girders 25 can be utilized as can be seen from FIG. 6.

Figure 7:
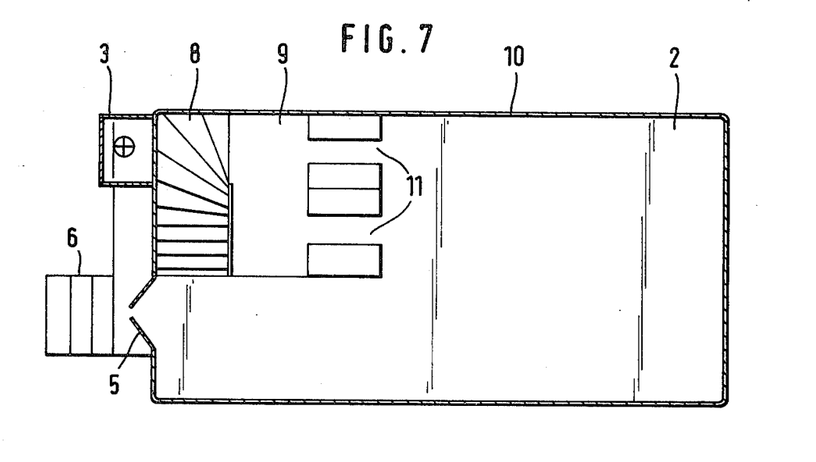
FIG. 7 is a top view of the upper story.

In FIG. 7, a top view of the upper story 2, which the air passengers reach via a staircase 8 is shown. They then arrive in an area 9 for a security check. There, the air passengers and, if required, the carry-on baggage are examined for carried-on weapons, and if necessary, passports are checked. This is done at the passages 11. The air passengers can subsequently remain in the upper story where, of course, seating, not shown, is provided. When they reach the aircraft, the air passengers can change to the aircraft immediately from the exit 5 via the stairs 6.

As shown in FIG. 8, the air passengers enter the cabin 10 at the entrance 4 and get into a hallway 12 which extends in the longitudinal direction and on the left side of which a bench 13 for sitting or setting down baggage may be provided. Along the middle of the lower story 1 the check-in windows 14, which comprise the customary data display equipment 15 or a complete reservation data terminal, extend. This equipment is connected via radio to the central data processing installation of the airport in a manner not shown. Between the check-in windows 14, baggage conveyors 16 are provided which run in the transverse direction and transport baggage from the side of the hallway 12 to the side opposite the check-in windows 14, where it is transferred to a deposit area 17 which advantageously is likewise designed as a conveyor and is capable of transporting the baggage through the door 7 in the direction of the arrow 18. The deposit area 17 can also be designed as a roller track or in a similar manner so that the baggage can be automatically pushed together tightly. The baggage transported out of the door 7 is picked up over on the outside by a further conveyor device which passes it on directly into the baggage space of the aircraft.

As mentioned, the air passengers enter the lower story of the cabin 10 at the entrance 4, are dispatched at the check-in windows 14 at which time the baggage may be transferred to the deposit area 17, change to the upper story 2 via the staircase 8, pass through the security area 9, and then gather in the upper story 2. After leaving the passages 11, the air passengers are completely processed and can move into the aircraft without further checking. They also cannot leave the upper story 2 any more because they were registered in the compartment 9. The entire dispatch and checking of the air passengers can take place during the entering time into the vehicle 100, during the latter's trip to the aircraft and even during the disembarking time of part of the passengers at the aircraft itself.

For disembarking, the travel of the air passengers is, of course, in the opposite direction.

Figure 9:
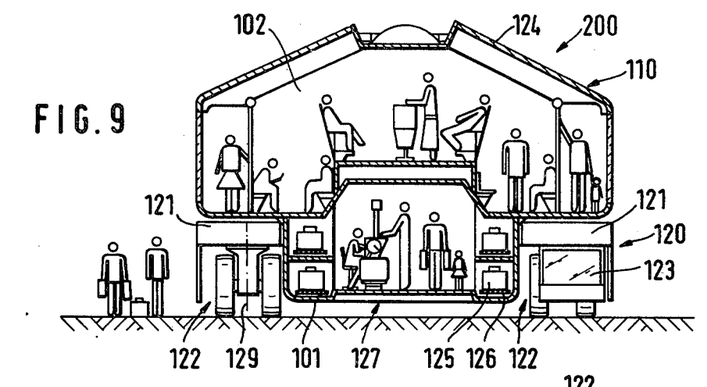
FIG. 9 is a vertical section through a vehicle which is built on a frame with individual steerable wheel sets.

The vehicle 200 in FIG. 9 comprises a cabin 110 which consists of a lower story 101 and an upper story 102. The cabin 110 is supported by a chassis 120 and comprises two frame girders 121 which are opposite and parallel to each in the other in the longitudinal direction in a horizontal plane, and under which individually steerable and driven wheel sets 122 are mounted. The steering excursions of the individual wheel sets 122 is accomplished via a central control which coordinates the steering excursions and coordinates, when negotiating a curve, in dependence on the distance of the individual wheel set 122 from the respective center of the curve. The steering is done by a driver in a driver's cabin 123 which is likewise attached under the platform represented by the frame girders 121.

The upper story 102 rests on the top side of the frame girders 121, while the lower story is suspended between the frame girders 121. It extends into the upper story 102 by a certain amount. The space lost thereby in the upper story 102 is regained by a corresponding inclined design of the roof 124.

The passengers enter the lower story of the vehicle 200, deposit their baggage 125 on the corresponding conveyor belts 126 extending in the longitudinal direction of the vehicle, and are processed at the windows 127. They then walk into the upper story 102 via a staircase, not shown, in the process of which the security checks are made. During the trip until entering the aircraft, which is accomplished via a bridge leading directly to the entrance door of the aircraft, the passengers stay in the upper story 102.

Figures 10, 10A, 10B, 10C:
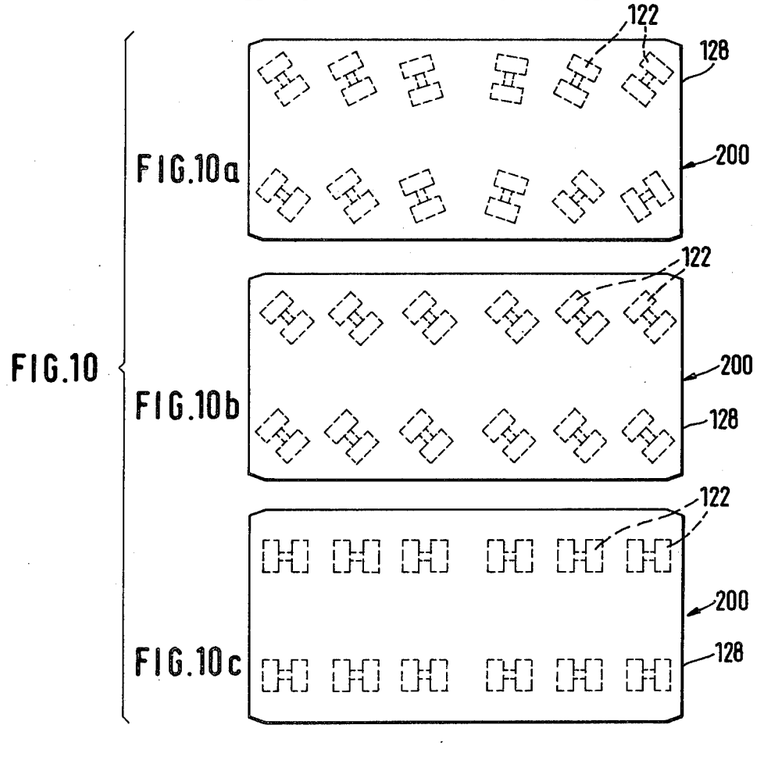
FIGS. 10a, 10b and 10c illustrate schematically the maneuverability of such a vehicle.

In FIGS. 10a, 10b and 10c, the distribution of the wheel sets 122 over the chassis 120 is shown. The vehicle 200 is indicated by its outline 128.

The wheel sets are distributed symmetrically over the underside of the frame 120. In the embodiment of FIGS. 10a, 10b and 10c, each wheel set 122 has twin tires on both sides of the vertical axes of rotation 129 (FIG. 9), while only single tires are provided in FIG. 9. A total of 6 wheel sets 122 is attached in tandem to each frame girder 121, the wheel sets of the two frame girders 121 being opposite each other in the transverse direction. The number of wheel sets is not mandatory but depends on the size of the vehicle 200 and the carrying capacity of the wheels used.

In FIG. 10a, the individual wheel sets 122 are set so that the vehicle 200 can negotiate a curve, the center of which is located below FIG. 10a. All wheel axles go through the center of the curve. The axles can be relocated anywhere, so that the vehicle 200 can negotiate very narrow curve radii and even can turn on the spot.

In the example according to 10b, the vehicle as a whole executes a movement at an angle, and in the example according to FIG. 10c, executes transverse travel. All these possibilities are set by the central control in response to operation of the steering wheel in the cabin 123. The location of the support points of the chassis 120 is not changed thereby, so that the stability of the vehicle 200 is not affected by the state of the steering.

The individual wheel sets 122 are driven electrically or hydraulically.

Figure 11:
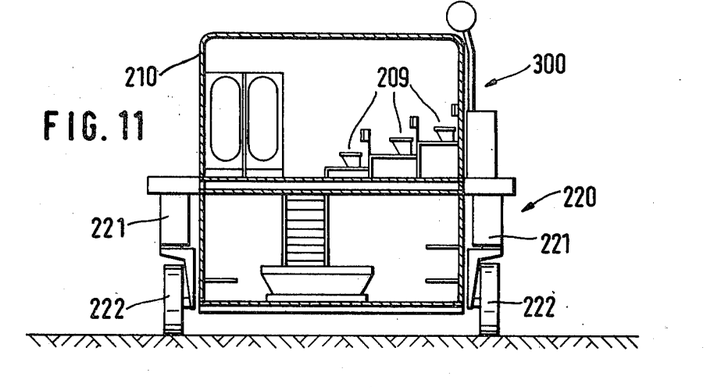
FIG. 11 is a top view of a single-storied vehicle.
Figure 12:
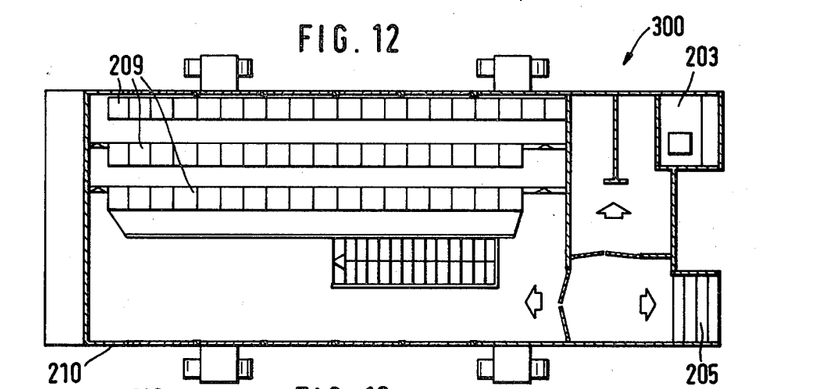
FIG. 12 is a view of the embodiment according to FIG. 6 from below.
Figure 13:
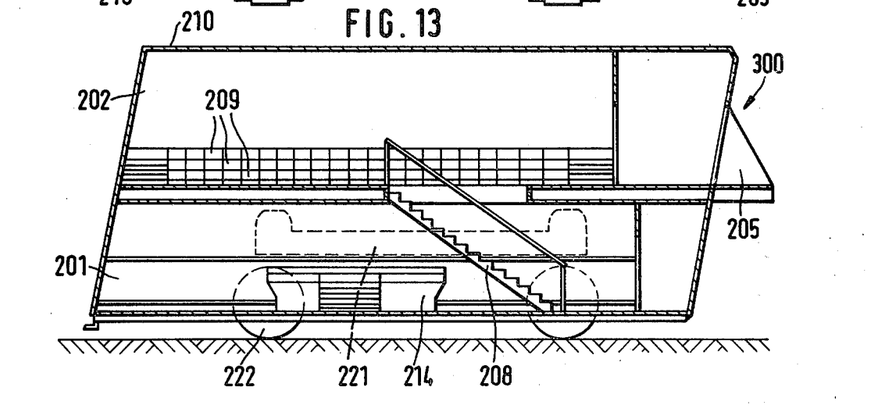
FIG. 13 is a vertical section through an embodiment of the vehicle with rows of seats staggered in height.

In the vehicle 300 of FIGS. 11 to 13, the cabin is supported by a container transporter chassis 220 and of which the longitudinal girders 221 with the air-tire wheels 222 mounted underneath can be seen in FIGS. 11 and 13. The vehicle 300 is operated from the driver's cabin 203 which is attached to the front of the vehicle 300. The entrance is located in the lower story 1, while the exit 205 is provided in the upper story 203. The exit 205 can be adapted by suitable measures to the different height levels of the entrances of the aircraft, for instance, by a ramp or bridge adjustable in height, in order to make possible the passage of the air passengers from the upper story 202 directly into the entrance of the aircraft.

The air passengers are processed at the windows 214 and arrive, if necessary, after security checks are performed, via the staircase 201, in the upper story 202, where they can be seated on rows of seats 209 which extend along one side wall of the vehicle and are staggered in height, so that the outer rows of seats are arranged highest.

Figure 14:
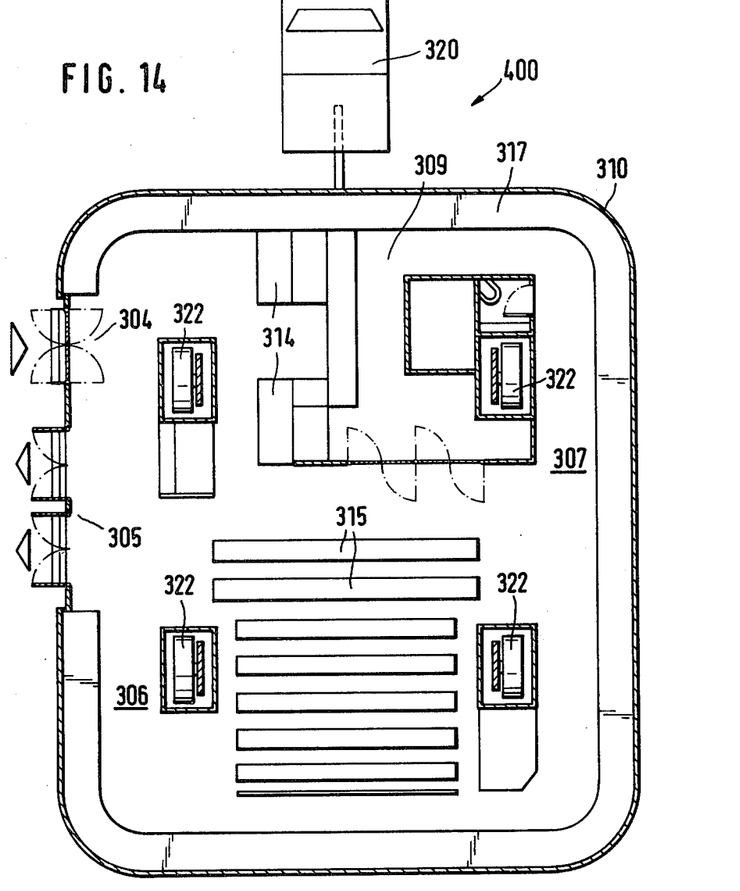
FIG. 14 is a top view of the upper story of the vehicle according to FIG. 5.
Figure 15:
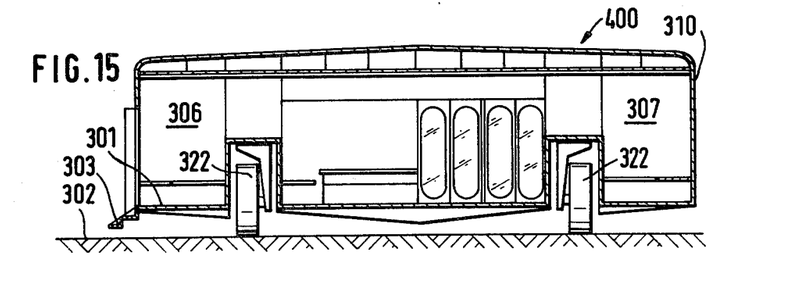
FIG. 15 is a vertical longitudinal section through the vehicle

The vehicle 400 of FIGS. 14 and 15 has a cabin 310 which has only one story. The floor 301 of the cabin 310 is close to the ground level 302, so that entering is possible by means of only two steps 303. Parts 306 and 307 of the cabin 310 are arranged outside of the track width defined by the wheels 322, so that the vehicle is very wide. The entrance 304 and the exit 305 are side by side at the same height. For boarding the aircraft, a separate boarding ladder is therefore required. Instead of the exit 305, a bridge or ramp rigidly connected to the vehicle 400 can, of course, also be provided for direct entrance into the aircraft.

The processing takes place at the windows 314, and the security check in the area 309. The air passengers stay in the rows of seats 315. The baggage deposit 317 is located at the side walls.

The vehicle 400 is not self-propelled but is towed by a tractor 320.

Figure 16:
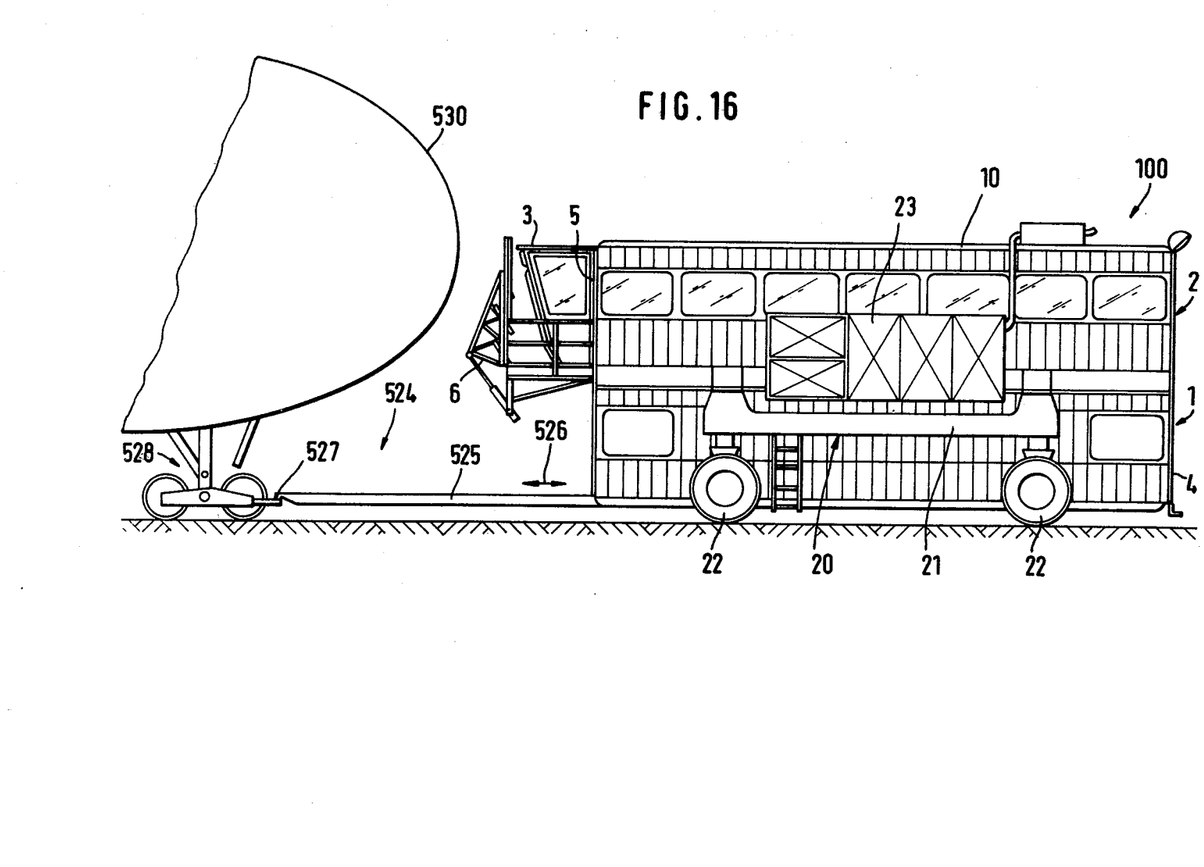
FIG. 16 is a view of a vehicle with a coupling device.

The vehicle 100 of FIG. 16 corresponds substantially to the embodiment according to FIGS. 1 to 8 and, to this extent, carries the same reference numerals. The staircase 6 is folded up in FIG. 16 because in the operating condition shown, the boarding of the air passengers is already completed.

Under the floor of the lower story 4, a coupling device 524 is attached and comprises a coupling rod 525 which can be run forward from under the vehicle 100 in the direction of the arrow 526 and can be retracted under the vehicle. At the front end, the coupling rod 525 has a coupling pin 527 which engages a corresponding device at the front wheel set 528 of the aircraft 530. In this manner the aircraft 530 can be pushed or pulled by means of the propulsion of the vehicle 100.

What is claimed is:

1. A method for dispatching air passengers between the arrival in an arrival zone and the boarding of the airplane, including check-in, baggage checking and transportation from the arrival zone to an aircraft standing at a ramp, comprising:

(a) conducting the air passengers, after arrival at an arrival zone, into a vehicle together with their baggage;
    (b) carrying out check-in, and baggage checking in said vehicle; and
    (c) transporting the air passengers directly to the aircraft in said vehicle.

2. The method according to claim 1, and further including carrying out a security check in said vehicle.

3. The method according to claim 1, and further including towing the aircraft at the ramp with said vehicle.

4. A vehicle for dispatching air passengers between arrival at an arrival zone and boarding of the airplane, including check-in, baggage checking and transportation from the arrival zone to an aircraft standing at a ramp, comprising:

(a) a vehicle; and
    (b) a cabin disposed on said vehicle having therein an arrival zone for the air passengers, with facilities for checking-in, and facilities for receiving baggage, whereby the air passengers can be transferred, together with the baggage, from the arrival zone directly to the aircraft.

5. A vehicle according to claim 4, wherein said cabin has a capacity to accommodate at least a substantial part of the air passengers of an aircraft.

6. A vehicle according to claim 4, wherein said cabin has two stories, the lower story having an entrance accessible from the ground, and an exit provided in the upper story which may be brought into direct connection with the entry of the aircraft.

7. A vehicle according to claim 6, and further including an adjustable staircase at said exit.

8. A vehicle according to claim 6, wherein said check-in windows extend along the middle of the lower story and a set-down zone for baggage comprising a longitudinal conveyor is arranged on the longitudinal outer side of the vehicle opposite the access side of the check-in windows.

9. A vehicle according to claim 4, wherein said check-in facility contains data display equipment for checking reservations and means for storing further reservation actions.

10. A vehicle according to claim 9, wherein said data display equipment is connected via radio to a central data processing system.

11. A vehicle according to claim 4, wherein said cabin has lower and upper stories, said check-in facility located in the lower story, and means opposite said entrance means for transferring air passengers from said lower to said upper story.

12. A vehicle according to claim 4, wherein said cabin has lower and upper stories, said check-in facility located in the lower story, an entrance in said lower story and means opposite said entrance for transferring air passengers from said lower to said upper story and in the region of said means for transfer, a compartment for the security check of air passengers and carry-on baggage, the only passage to the upper story passing through said compartment.

13. A vehicle according to claim 4, wherein said cabin is supported by a container transporter chassis.

14. A vehicle according to claim 6, wherein said cabin is supported by a container transporter chassis having supporting longitudinal girders bridged by transverse members, said tranfser members extending between the stories at the height of the ceiling or floor, and supporting the cabin.

15. A vehicle according to claim 4, wherein said cabin is supported by a container transporter chassis and wherein a part of the cabin extends in the transverse direction between the wheels of the container transporter chassis and another part extends laterally outside thereof.

16. A vehicle according to claim 4, wherein said vehicle is self-propelled.

17. A vehicle according to claim 4, wherein said cabin is supported on a self-supporting and self-propelled, substantially horizontal frame under which several wheel sets which can rotate 360° and are controlled in mutual dependence, are arranged.

18. A vehicle according to claim 6, wherein said cabin is supported on a self-supporting and self-propelled, substantially horizontal frame, under which several wheel sets which rotate 360°, and are controlled in mutual dependence are disposed, said frame comprising two lateral frame girders extending in the longitudinal direction, the lower story of the cabin suspended between the frame girders and the upper story supported on the frame girders.

19. A vehicle according to claim 4, wherein said cabin has one story and has areas extending laterally beyond the track width.

20. A vehicle according to claim 4, wherein said cabin has one story and has areas extending laterally beyond the track width, and wherein the floor of the cabin is disposed at a low enough height above ground that it can be climbed via at most three steps.

21. A vehicle according to claim 4, wherein said cabin has at least on seating arrangement for the air passengers which rises in several steps and comprises several rows of seats which are higher toward the outside and extend in the longitudinal direction of the vehicle at the side wall thereof.

22. A vehicle according to claim 4, and further including a track system for said vehicle which passes by an arrival zone as well as by the ramp in the immediate vicinity of the aircraft.

23. A vehicle according to claim 21, wherein said vehicle has wheel sets for selective travel over the track system as well as for travel on a trackless running surface.

24. A vehicle according to claim 4, and further including a coupling device by means of which said vehicle can be coupled to the aircraft to tow the aircraft.

25. A vehicle according to claim 23, wherein said coupling device comprises a coupling rod extending in the longitudinal direction which can be extended and retracted to be moved in the longitudinal direction out of the vehicle or stowed under the vehicle.

26. A vehicle according to claim 4, wherein said vehicle is an air-cushion vehicle, especially for transport on water.

27. A vehicle according to claim 4, and further including a facility for carrying out a security check in said cabin.

* * * * *